(12) United States Patent
Lee

(10) Patent No.: US 8,265,604 B2
(45) Date of Patent: Sep. 11, 2012

(54) MOBILE PHONE AND CALL PROCESSING METHOD OF MOBILE PHONE

(75) Inventor: Jang Su Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1330 days.

(21) Appl. No.: 11/627,328

(22) Filed: Jan. 25, 2007

(65) Prior Publication Data

US 2007/0190986 A1 Aug. 16, 2007

(30) Foreign Application Priority Data

Jan. 25, 2006 (KR) .................. 10-2006-0007875

(51) Int. Cl.
*H04M 3/42* (2006.01)
(52) U.S. Cl. .................. 455/414.1; 455/414.2; 455/415; 455/418; 455/412.2
(58) Field of Classification Search .................. 455/415, 455/414.1, 414.2, 412.2; 370/352; 379/142.01
See application file for complete search history.

(56) References Cited

U.S. PATENT DOCUMENTS

| | | | | |
|---|---|---|---|---|
| 2003/0100295 | A1* | 5/2003 | Sakai et al. | 455/415 |
| 2005/0059384 | A1* | 3/2005 | Kuusinen et al. | 455/414.1 |
| 2005/0064854 | A1* | 3/2005 | Jang | 455/415 |
| 2005/0113076 | A1* | 5/2005 | Lee | 455/415 |
| 2005/0130631 | A1* | 6/2005 | Maguire et al. | 455/414.1 |
| 2005/0141686 | A1* | 6/2005 | Matsunaga et al. | 379/142.01 |
| 2005/0250483 | A1* | 11/2005 | Malik | 455/415 |
| 2006/0116114 | A1* | 6/2006 | Kadado | 455/415 |
| 2006/0159067 | A1* | 7/2006 | Chen et al. | 370/352 |

FOREIGN PATENT DOCUMENTS

| | | |
|---|---|---|
| KR | 1020030043856 | 6/2003 |
| KR | 1020050119597 | 12/2005 |

* cited by examiner

*Primary Examiner* — Kathy Wang-Hurst
(74) *Attorney, Agent, or Firm* — Lee, Hong, Degerman, Kang & Waimey

(57) ABSTRACT

The present invention provides a mobile phone including a memory unit for storing at least one phone number, search information representing specific search conditions corresponding to the phone number, and a plurality of recorded data; and a control unit for extracting search information corresponding to the phone number of a communication counterpart, searching for recorded data satisfying a search condition included in the search information from among the plurality of recorded data using the extracted search information, and outputting the searched recorded data when a call terminating or originating service operation for telephone communication is requested. According to the present invention, a user can refer to recorded data related to a communication counterpart while using call terminating or originating call services for telephone communication so that the user can more efficiently communicate with the counterpart.

17 Claims, 9 Drawing Sheets

MOBILE PHONE AND CALL PROCESSING METHOD OF MOBILE PHONE

CROSS-REFERENCE TO RELATED APPLICATIONS

Pursuant to 35 U.S.C. §119(a), this application claims the benefit of earlier filing date and right of priority to Korean Application 10-2006-0007875, filed on Jan. 25, 2006, the contents of which is hereby incorporated by reference herein in its entirety.

FIELD OF THE INVENTION

The present invention is directed to a mobile phone and a call processing method of a mobile phone and more particularly, to a mobile phone and a call processing method of a mobile phone, wherein recorded data related to a corresponding communication counterpart are output while a call originating or terminating service operation for telephone communication is performed.

DESCRIPTION OF THE RELATED ART

A conventional mobile phone is implemented such that when a call is received from another phone, only the phone number of the corresponding other phone or personal name information extracted according to the originating call phone number is displayed on a screen. Accordingly, when a call is received, a user can know who the originating caller is and/or what the origination phone number is through displayed information. However, the user cannot know data related to the originating caller or originating phone number, such as previously exchanged messages.

Specifically, if a user receives a call from a certain counterpart after a certain message sent from the counterpart has been received but not yet confirmed by the user, the user does not know that the message has been received, since the user first has to receive the call. Furthermore, once telephone communication is performed through the phone, other data cannot be displayed without interrupting the telephone communication and, therefore, the user cannot confirm other information related to the counterpart such as a memo or a schedule.

Since the user cannot see other data while performing telephone communication with the counterpart, the user has difficulties in communication due to lack of information. Furthermore, the user suffers the inconvenience of interruption of the telephone communication in order to confirm a message or other information exchanged with the counterpart.

SUMMARY OF THE INVENTION

An object of the present invention is to provide a mobile phone and a call processing method of a mobile phone, wherein recorded data related to a certain counterpart are displayed so that a user can efficiently perform telephone communication with the counterpart.

In one aspect of the present invention, a mobile phone is provided. The mobile phone includes a memory unit adapted to store at least one phone number, search information corresponding to the at least one phone number and a plurality of recorded data and a control unit adapted to extract search information corresponding to a phone number of a communication counterpart, search for recorded data from among the plurality of recorded data that satisfies a search condition included in the search information and output the searched recorded data when one of a call terminating and originating service operation for telephone communication is requested, wherein the search is performed using the extracted search information.

It is contemplated that the search information includes at least one of a specific keyword and information for designating a type of data to be searched. It is further contemplated that the recorded data includes at least one of message data, absent subscriber call log data, absent subscriber transcription data, schedule data, memo data and photograph data.

It is contemplated that the control unit includes a call processing section adapted to perform the call terminating or originating service operation with a specific phone number, a search information extracting section adapted to extract the search information using the specific phone number and a recorded data processing section adapted to search the memory unit for the recorded data that satisfies the search condition and output the searched recorded data. It is further contemplated that the recorded data processing section is further adapted to display the searched recorded data on a screen.

It is contemplated that the recorded data processing section is further adapted to display at least one of unconfirmed message data and most recently received message data from among corresponding message data on the screen if the searched recorded data is message data. It is further contemplated that the recorded data processing section is further adapted to output the searched recorded data as an audio signal if the searched recorded data is absent subscriber transcription data.

In another aspect of the present invention, a mobile phone call processing method is provided. The method includes performing one of a call terminating and originating service operation with a specific phone number, extracting search information corresponding to the specific phone number using one of a terminating and an originating call's phone number, searching for recorded data including the extracted search information and outputting the searched recorded data.

It is contemplated that performing one of the call terminating and originating service operation includes receiving a specific setup message for telephone communication from another party and extracting a phone number of the other party included in the setup message. It is further contemplated that extracting the search information includes using the originating call's phone number to extract the search information if a specific phone number is called for performing the call originating service operation.

It is contemplated that the search information includes at least one of a specific keyword and information related to designating a type of data to be searched. It is further contemplated that the recorded data includes at least one of message data, absent subscriber call log data, absent subscriber transcription data, schedule data, memo data, and photograph data.

It is contemplated that outputting the searched recorded data is performed while telephone communication is performed through the one of the call terminating and originating service operation. It is further contemplated that outputting the searched recorded data is performed when a predetermined control signal is received while telephone communication is performed through the one of the call terminating and originating service operation.

It is contemplated that the searched recorded data is output on a screen. It is further contemplated that the method further includes displaying one of unconfirmed message data and most recently received message data from among corresponding message data on the screen if the searched recorded data is message data.

It is contemplated that the method further includes one of hiding the displayed searched recorded data and displaying other recorded data if a predetermined control signal is received while the searched recorded data are displayed on the screen. It is further contemplated that outputting the searched recorded data includes displaying a plurality of items for which recorded data may be displayed and displaying recorded data related to a specific one of the plurality of items upon selection of the specific item.

It is contemplated that the method further includes outputting absent subscriber transcription data corresponding to the searched recorded data if the searched recorded data is absent subscriber transcription data and wherein the absent subscriber transcription data is output as an audio signal. It is further contemplated that the method further includes setting one of a type and order of recorded data to be searched.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
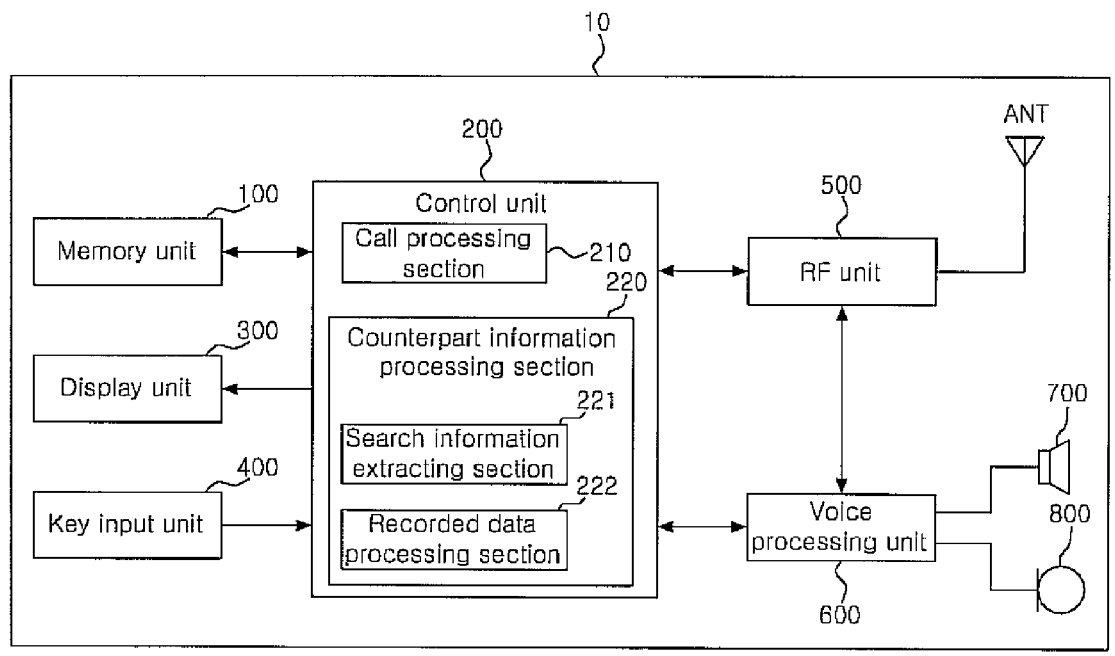
FIG. 1 is a block diagram schematically illustrating a configuration of a mobile phone performing a call processing method according to an embodiment of the present invention.

Preferred embodiments of the present invention will be described in greater detail with reference to the accompanying drawings. FIG. 1 is a block diagram schematically illustrating a configuration of a mobile phone 10 performing a call processing method according to an embodiment of the present invention.

As illustrate in FIG. 1, the mobile phone 10 includes a memory unit 100 for storing a program for performing a procedure of outputting recorded data related to a counterpart of call terminating or originating services, hereinafter referred to as a 'communication counterpart guide program', a control unit 200 for reading the program stored in the memory unit and performing the corresponding procedure, a display unit 300 for providing a display window, a key input unit 400, a radio frequency (RF) unit 500, a voice processing unit 600, a speaker 700, and a microphone 800.

The memory unit 100 stores a communication program for performing telephone communication related to call terminating or originating services, the communication counterpart guide program programmed with a procedure to output recorded data related to the counterpart of the call terminating or originating services using recorded information, and a variety of functional operation programs of the mobile phone 10. The memory unit 100 also stores a plurality of data recorded by a data recording operation and search information representing certain search conditions.

In the data recording operation, a variety of programs provided in the mobile phone 10 perform storage of electronic information of corresponding data in cells of the memory unit 100 based on a known memory recording scheme in order to store arbitrary data. The recorded data may be at least one of message data received from a certain counterpart, absent subscriber call log data, absent subscriber transcription data, schedule data prepared to represent a schedule with a certain counterpart, memo data prepared to represent information on a certain counterpart, and photograph data taken for a certain counterpart. Additionally, the search information may be at least one of a certain keyword, such as a phone number, personal name information or search word information corresponding to the phone number and information for use in designating the type of recorded data to be searched.

The control unit 200 function controls overall operations of the mobile phone 10. Specifically, the control unit 200 performs a call terminating or originating call service operation for telephone communication and an operation to output recorded data related to a counterpart in accordance with the procedure of the communication counterpart guide program. The control unit 200 includes a call processing section 210 to perform a call terminating or originating service operation and a counterpart information processing section 220 to output recorded data related to a counterpart of a corresponding call terminating or originating service.

When a setup message requesting call terminating services arrives from a certain phone number based on a known technique, the call processing section 210 performs a call terminating service operation for the corresponding phone number. The call processing section 210 then performs a call originating service operation by sending a setup message requesting call originating services to a certain phone number based on a predetermined control signal.

Figure 2:
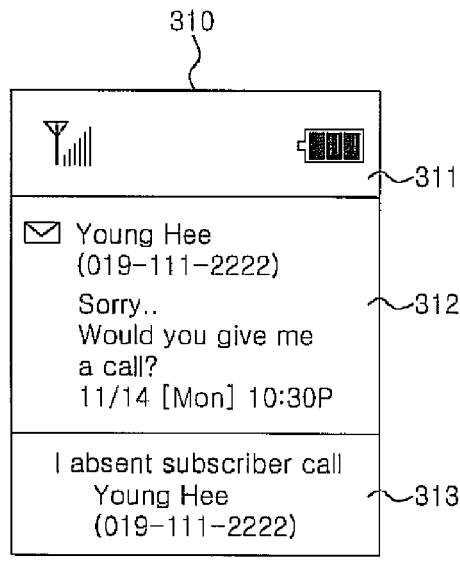
FIGS. 2-4 illustrate applications of a mobile phone according to one embodiment of the present invention.
Figure 3:
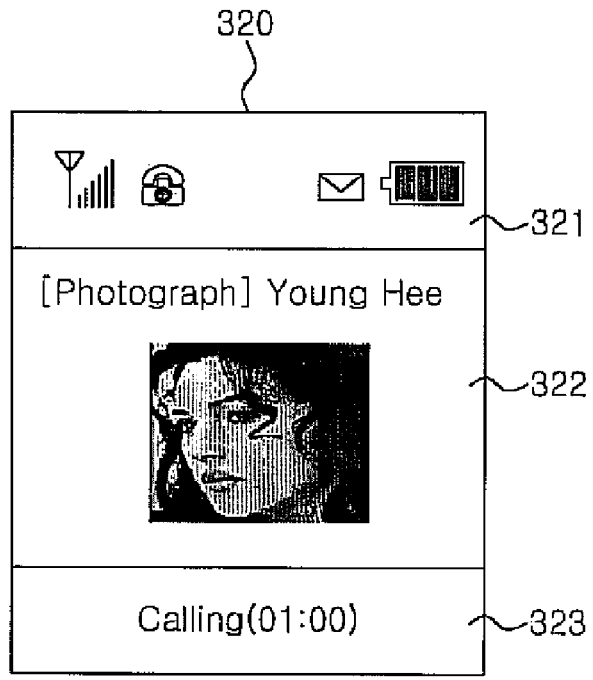
Figure 4:
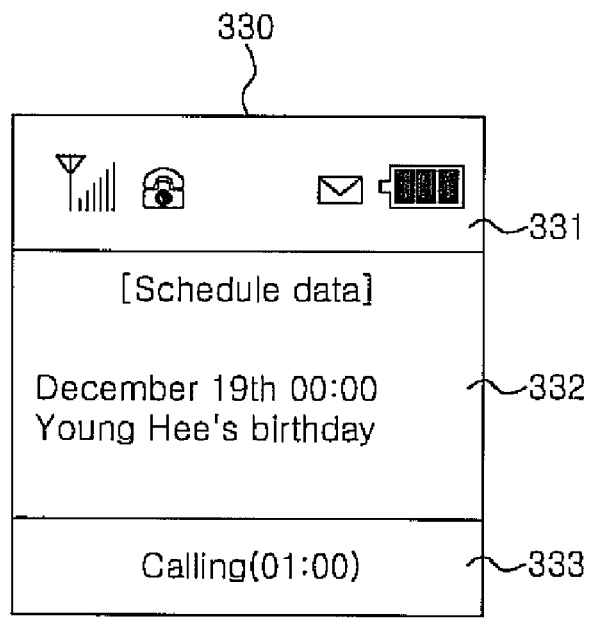

The counterpart information processing section 220 includes a search information extracting section 221 and a recorded data processing section 222 in order to output recorded data related to a call terminating or originating service. The search information extracting section 221 extracts search information corresponding to a phone number from the memory unit 100 using a phone number of a counterpart of a corresponding call terminating or originating service. The recorded data processing section 222 searches recorded data, which includes corresponding search information, from among a plurality of recorded data stored in the memory unit 100 and outputs the searched recorded data on a call screen window 310, 320 or 330 as illustrated in FIGS. 2-4. For example, when the call processing section 210 performs call terminating services, the search information extracting section 221 extracts search information, such as "Young Hee" corresponding to an originating call's phone number, such as "019-111-2222," included in a setup message of corresponding services.

FIGS. 2-4 illustrate applications of the mobile phone 10 according to an embodiment of the present invention in which a call terminating service operation is performed and the recorded data processing section 222 causes recorded data related to a counterpart to be displayed on the call screen window 310, 320 or 330. The call screen window 310, 320 or 330 comprises an upper area 311, 321 or 331 for displaying icons representing a plurality of states of the mobile phone, a data display area 312, 322 or 332 for displaying recorded data related to a counterpart, and a call display area 313, 323 and 333 for displaying data that represent the processing state of a call terminating or originating service operation.

Specifically, on the call screen window 310 illustrated in FIG. 2, the recorded data processing section 222 displays recorded data, such as message data, including corresponding search information, such as Young Hee, and the call processing section 210 displays the processing state of a call terminating service operation, such as one absent subscriber call. On the call screen window 320 illustrated in FIG. 3, the recorded data processing section 222 displays recorded data, such as photograph data, including corresponding search information, such as Young Hee, and the call processing section 210 displays the processing state of a call terminating service operation, such as calling (01:00). On the call screen window 330 illustrated in FIG. 4, the recorded data processing section 222 displays recorded data, such as schedule data, including corresponding search information, such as Young Hee, and the call processing section 210 displays the processing state of a call terminating service operation, such as calling (01:00).

The display unit 300 is a display device, such as a liquid crystal display (LCD), which displays the state of the mobile phone or the processing state of a program on a screen window (not shown) under control of the control unit 200. Specifically, the display unit 300 provides the call screen windows 310, 320 or 330, which represent the processing state of a call terminating or originating service operation, with a counterpart and recorded data related to the counterpart in accordance with an embodiment of the present invention.

The key input unit 400 includes a plurality of numeric keys, menu keys, and function keys for performing a variety of functions in order to output key data to the control unit 200 according to external manipulation.

The RF unit 500 is controlled by the control unit 200 and converts signals outputted from the control unit into radio signals. Additionally, the RF unit 500 converts radio signals received through an antenna into desired signals and outputs the converted signals.

The voice processing unit 600 modulates voice signals received from the microphone 800 into voice data and demodulates voice data received from the RF unit 500 into voice signals and outputs the voice signals through the speaker 700.

Figure 5:
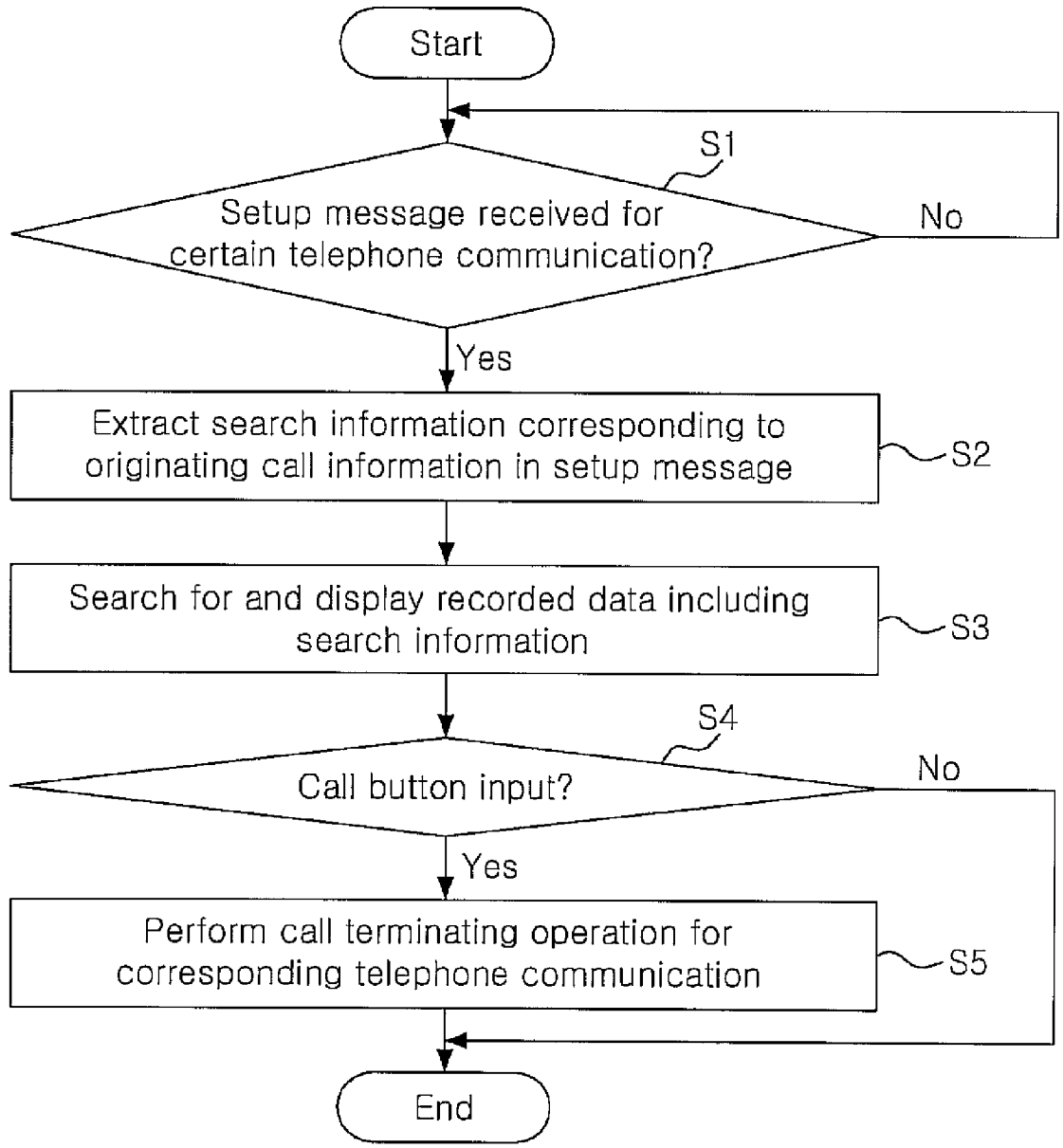
FIG. 5 is a flowchart illustrating an operation of a control unit provided in a mobile phone according to an embodiment of the present invention.
Figure 6:
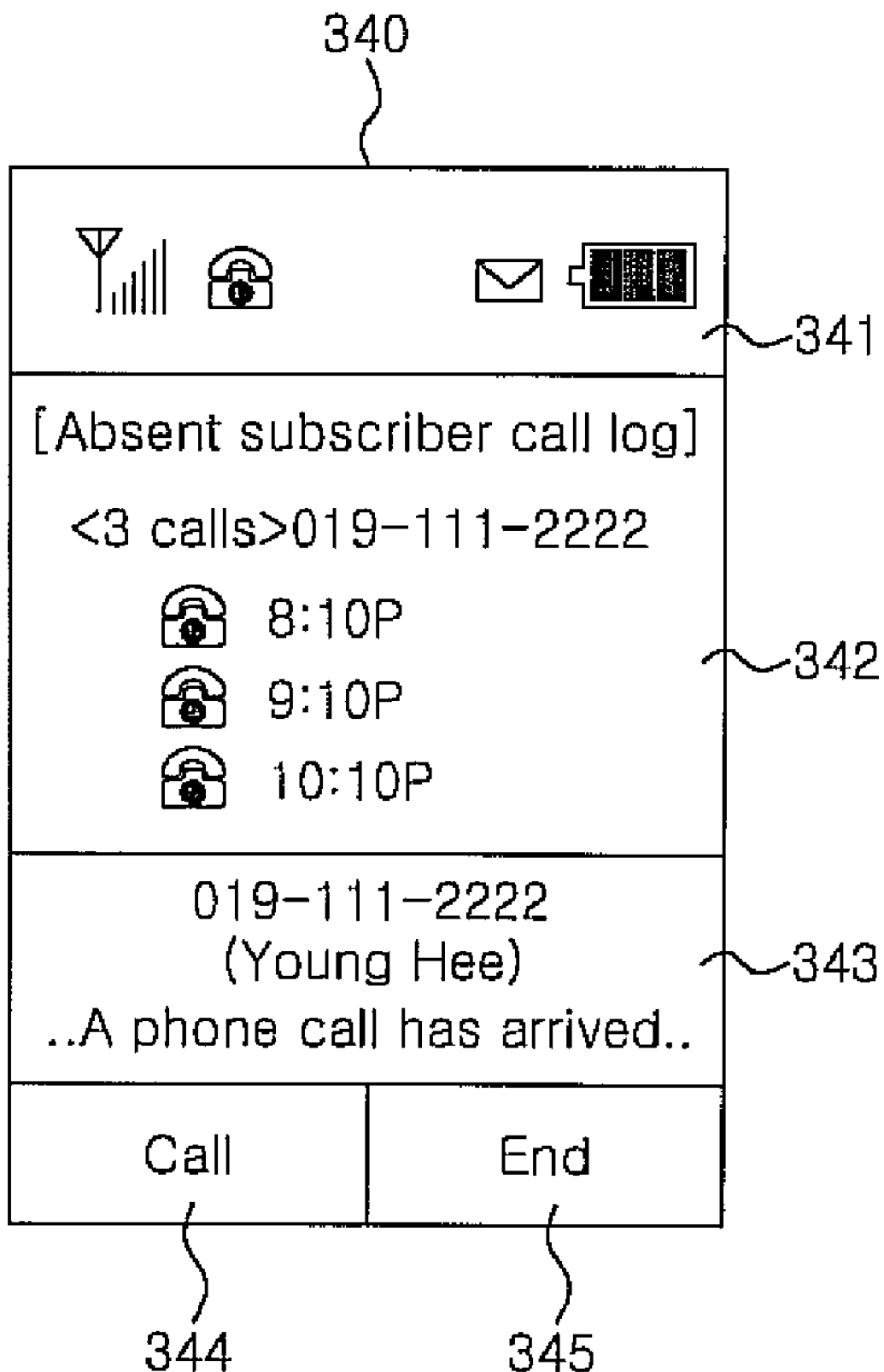
FIG. 6 illustrates an application of a mobile phone according to an embodiment of the present invention.

FIG. 5 is a flowchart illustrating a call terminating service operation of the control unit 200 provided in the mobile phone 10 according to an embodiment of the present invention; FIG. 6 illustrates an application of the mobile phone 10.

As illustrated in FIG. 5, the call processing section 210 determines whether a certain setup message for terminating a call is received (S1). If it is determined in step S1 that a certain setup message is received, the search information extracting section 221 extracts search information, such as "Young Hee," corresponding to originating call information, such as "019-111-2222," from the received setup message (S2), The recorded data processing section 222 searches for recorded data including corresponding search information, such as absent subscriber call log data, from the memory unit 100 by using the search information extracted in step S2 and displays the searched recorded data on the call screen window 340 (S3), as illustrated in FIG. 6.

The call screen window 340, as illustrated in FIG. 6, includes an upper area 341 for displaying icons representing a plurality of states of the mobile phone 10, a data display area 342 for displaying recorded data related to a counterpart, such as absent subscriber call log data, a call display area 343 for displaying data that includes receipt of a terminating call from the outside, a call button 344, and an end button 345. The recorded data displayed in the data display area 342 are absent subscriber call log data related to a counterpart, which includes the phone number of the counterpart, such as "019-111-2222", the number of calls processed as 'absent subscriber,' such as "three calls," and the contents of each call, such as call time. Accordingly, the recorded data processing section 222 searches for recorded data including corresponding search information, such as "Young Hee," from the memory unit 100 and displays the searched recorded data in the data display area 342.

The control unit 200 determines whether key data of the call button 344 are input from the key input unit 400 (S4). If it is determined in step S4 that key data of the corresponding call button 344 are input, the call processing section 210 allows telephone communication of call terminating services to be performed (S5).

Figure 7:
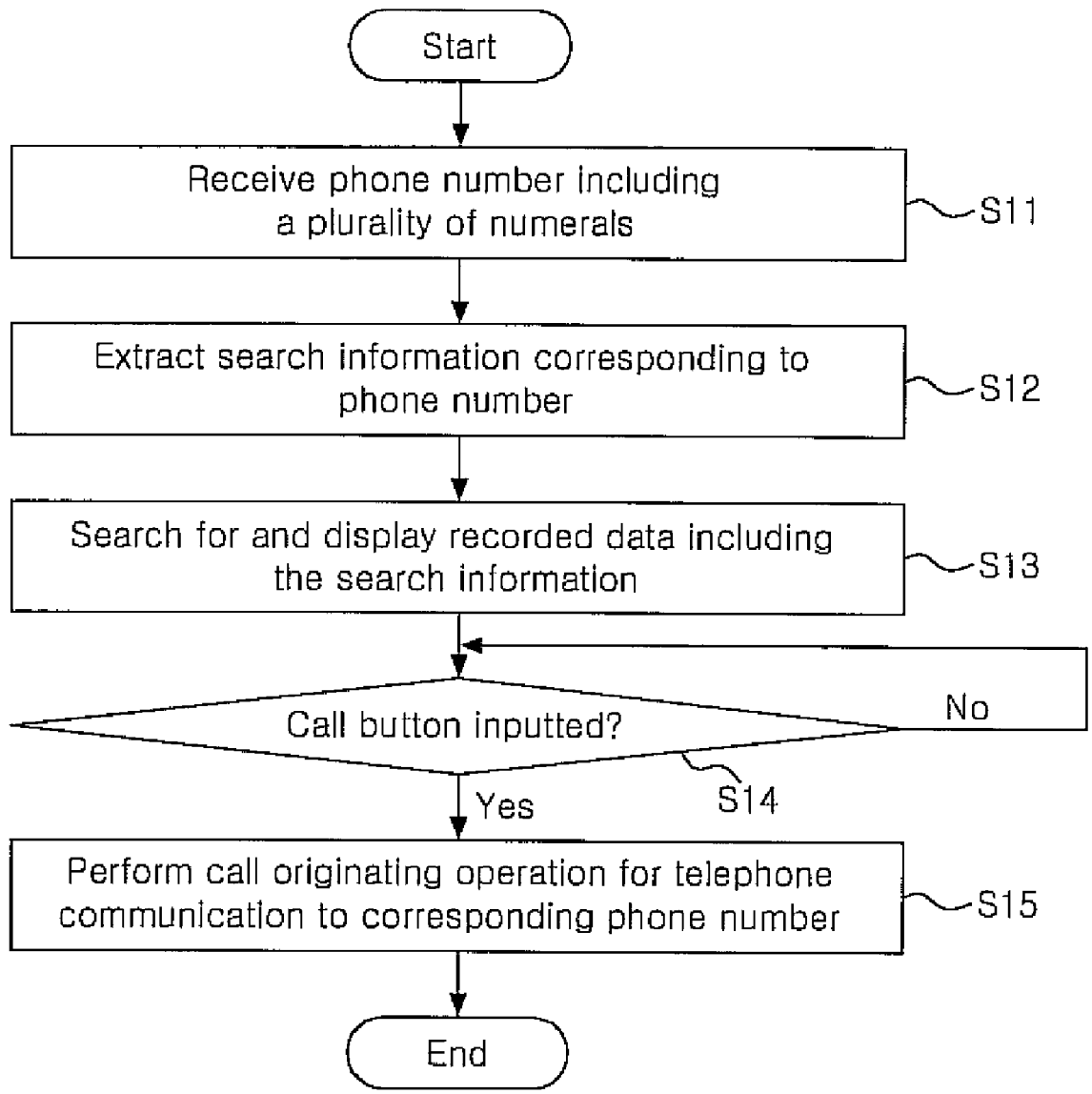
FIG. 7 is a flowchart illustrating an operation of the control unit provided in a mobile phone according to an embodiment of the present invention.
Figure 8:
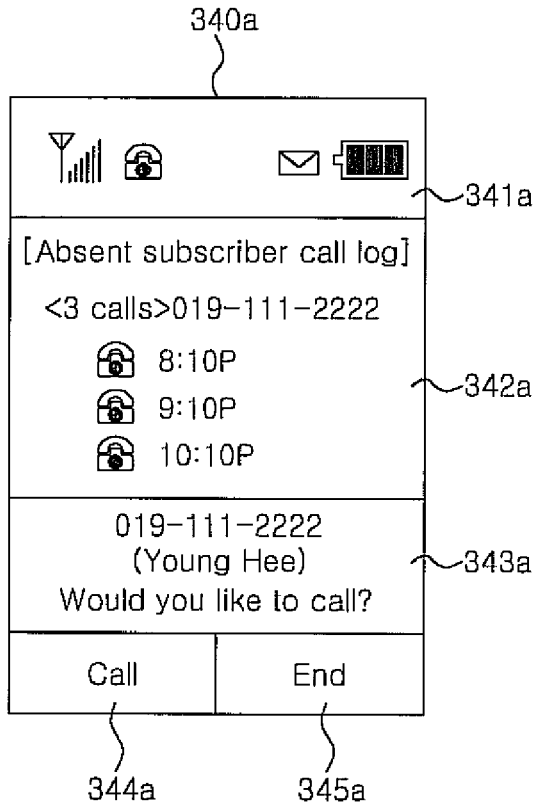
FIG. 8 illustrates an application of a mobile phone according to an embodiment of the present invention.

FIG. 7 is a flowchart illustrating an operation of the control unit 200 provided in the mobile phone 10 according to an embodiment of the present invention. FIG. 8 illustrates an application of the mobile phone10.

As illustrated in FIG. 7, the call processing section 210 receives a phone number including a plurality of numerals, such as "019-111-2222," provided according to a user's manipulation (S11). The search information extracting section 221 extracts search information corresponding to a phone number, such as the phone number "019-111-2222," using the inputted phone number (S12). The recorded data processing section 222 searches for recorded data including corresponding search information from the memory unit 100 using the search information extracted in step S12 and then displays the searched recorded data in the call screen window 340a (S13), as illustrated in FIG. 8.

The call screen window 340a illustrated in FIG. 8 includes an upper area 341a for displaying icons representing a plurality of states of the mobile phone, a data display area 342a for displaying recorded data related to a counterpart, such as absent subscriber call log data, a call display area 343a for displaying data that represent call originating services to an input phone number, a call button 344a, and an end button 345a. The recorded data displayed in the data display area 342a are absent subscriber call log data related to a counterpart, which includes the phone number of the counterpart, such as "019-111-2222", the number of calls processed as 'absent subscriber', such as "three calls", and the contents of each call such as call time.

The control unit 200 determines whether key data of the call button 344a are input from the key input unit 400 (S14).

If it is determined in step S14 that key data of the corresponding call button 344a are inputted, the call processing section 210 allows telephone communication of call originating services to be performed (S15).

The present invention is not limited to the disclosed embodiments and may be modified and changed variously by those skilled in the art. Such modifications and changes are included in the spirit and scope of the present invention defined by the appended claims.

For example, the counterpart information processing section 220 is disclosed as implemented such that, if a call terminating or originating service operation is requested through the call processing section 210, recorded data related to a counterpart is first displayed before telephone communication of the corresponding call terminating or originating service operation is performed. However, the present invention may also be implemented to display recorded data related to a counterpart even while telephone communication of a call terminating or originating service operation is being performed.

Figure 9:
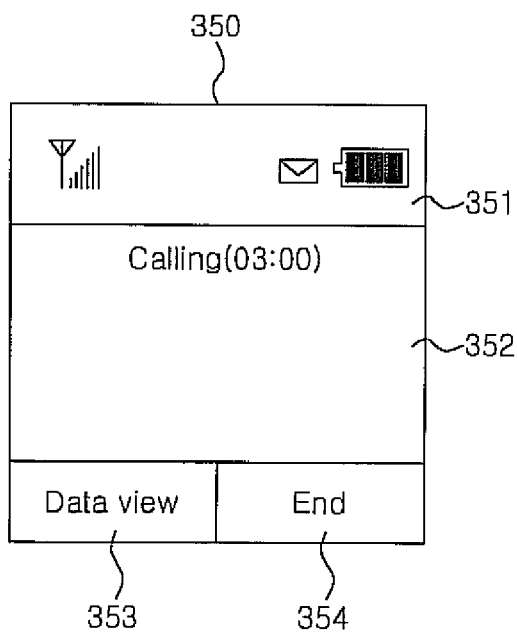
FIGS. 9-14 illustrate applications of mobile phones according to other embodiments of the present invention.
Figure 10:
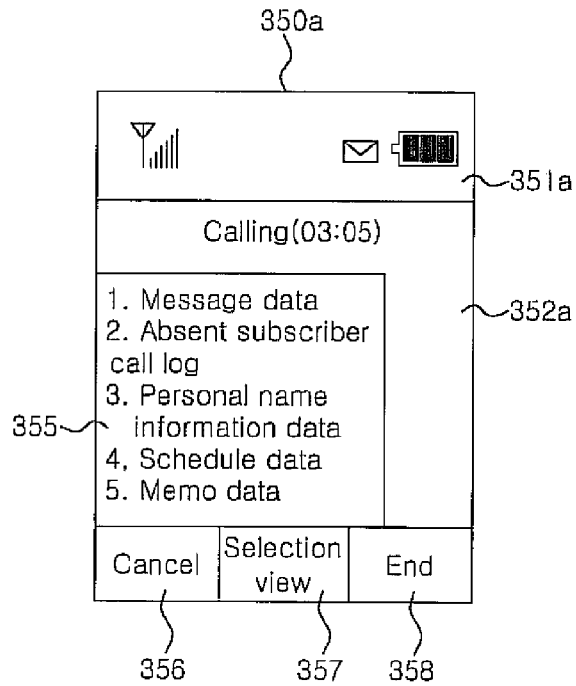

FIGS. 9 and 10 illustrate an application of a mobile phone 10 according to another embodiment of the present invention.

As illustrated in FIG. 9, the call screen window 350 includes an upper area 351 for displaying icons representing a plurality of states of the mobile phone 10, a call display area 352 for displaying the processing state of a call terminating or originating service operation, a data view button 353 for allowing recorded data related to a counterpart to be viewed, and an end button 345 for completing the call terminating or originating service operation. If the data view button 353 of the call screen window 350 is operated while the call processing section 210 is processing a call, the counterpart information processing section 220 displays a call screen window 350a on the display unit 300 for use in selecting recorded data for display, as illustrated in FIG. 10.

The call screen window 350a, illustrated in FIG. 10, includes an upper area 351a for displaying icons representing a plurality of states of the mobile phone 10, a call display area 352a for displaying the processing state of a call terminating or originating service operation, a list area 355 for displaying a plurality of items of recorded data for display, a cancel button 356 for hiding the items of the list area, a selection view button 357 for showing recorded data of an item selected from the list area, and an end button 358 for ending telephone communication. Accordingly, if a certain item is selected from among the items displayed in the list area 355 of the call screen window 350a, such as message data, absent subscriber call log data, personal name information data, schedule data, and memo data, the counterpart information processing section 220 searches for and displays recorded data related to a counterpart from among the recorded data of the corresponding item.

Although the counterpart information processing section 220 in the embodiment of the present invention is disclosed as displaying only one piece of recorded data related to a counterpart, the present invention is not so limited and may be implemented to further display other recorded data or to hide displayed recorded data in response to an input control signal. The control signal may be a signal created to display other recorded data or to hide displayed recorded data if predetermined key data are input or a predetermined period of time elapses.

Figure 11:
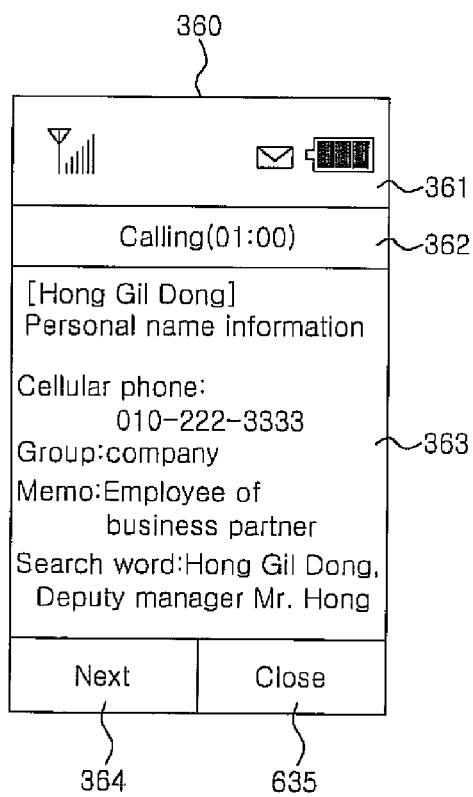

As illustrated in FIG. 11, the call screen window 360 includes an upper area 361 for displaying icons representing a plurality of states of the mobile phone 10, a call display area 362 for displaying the processing state of telephone communication of a call terminating or originating service operation, a data display area 363 for displaying recorded data, such as personal name information data, a next button 364 for allowing other recorded data to be displayed, and a close button 365 for hiding displayed recorded data. Accordingly, if the next button 364 is operated or a predetermined period of time elapses, the recorded data processing section 222 searches for other recorded data related to a counterpart and displays the searched recorded data in the data display area 363. If the close button 365 is then operated, the recorded data processing section 222 hides the recorded data displayed in the data display area 363.

Although the recorded data processing section 222 in the embodiment of the present invention is disclosed as searching and displaying all recorded data related to a counterpart from among recorded data stored in the memory unit 100, the present invention is not so limited. The recorded data processing section 222 may be implemented to selectively display recorded data by allowing a user to preset recorded data or the type of data to be displayed.

Figure 12:
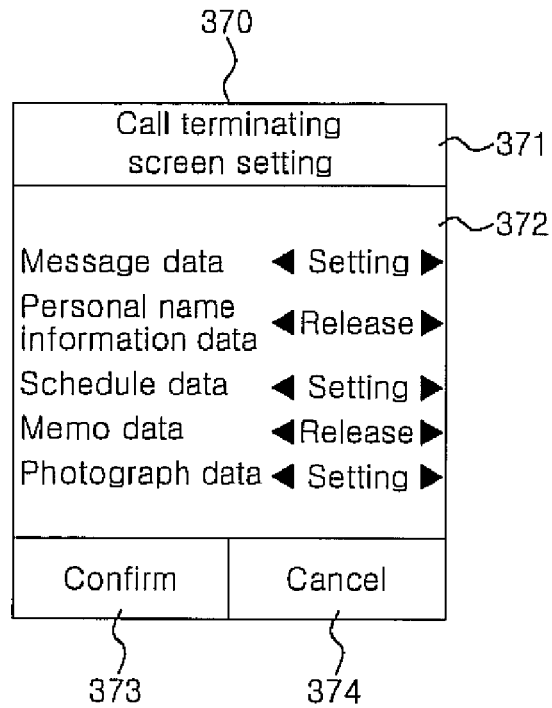
Figure 13:
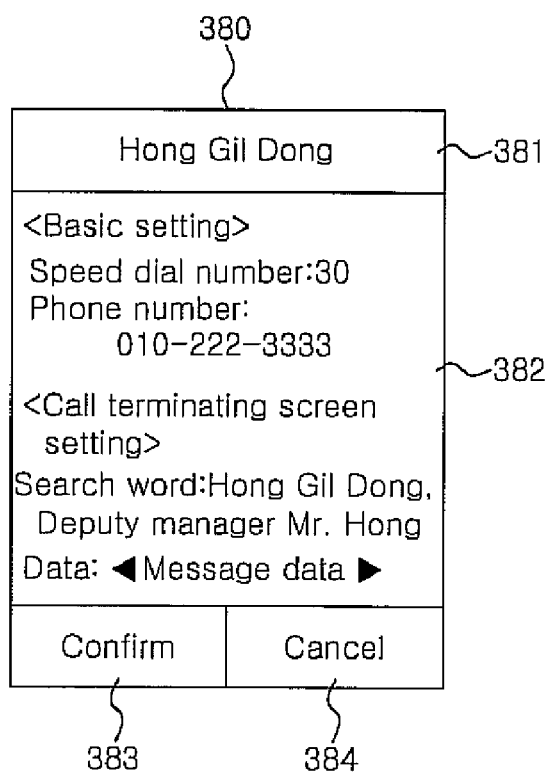
Figure 14:
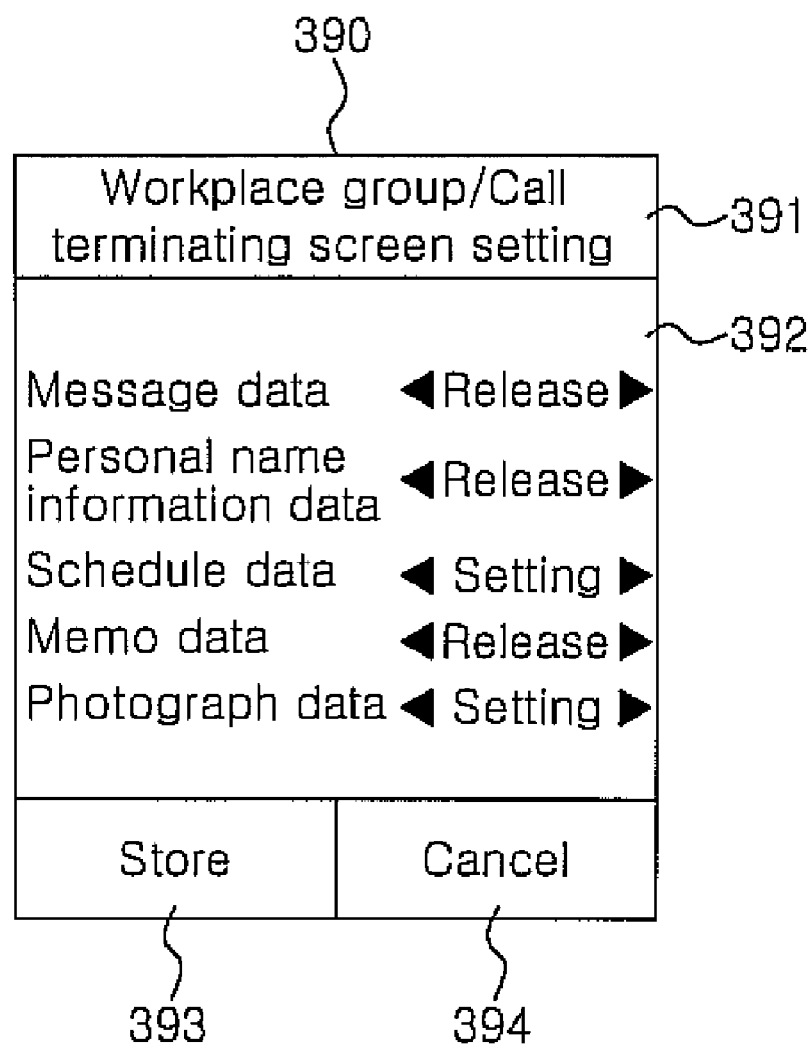

FIGS. 12-14 illustrate applications of a mobile phone 10 according to further embodiments of the present invention.

As illustrated in FIG. 12, a setting window 370 is provided for setting the types of recorded data to be searched as recorded data related to a counterpart. The setting window 370 includes an upper area 371 for indicating that the window is for use in setting the types of recorded data to be searched in the process of a call terminating service operation, a setting area 372 for setting whether recorded data are to be searched and displayed according to the types of recorded data, a confirm button 373, and a cancel button 374. Accordingly, a user can preset the types of recorded data related to a counterpart, such as message data, personal name information data, schedule data, memo data, and photograph data through the setting window 370.

As illustrated in FIGS. 13 and 14, setting windows 380 and 390 are provided having an additional setting field added to a program for setting personal name information data, such as a phone book program, in order to set whether recorded data are to be displayed.

As illustrated in FIG. 13, the setting window 380 for setting the types of recorded data to be displayed by personal name information includes an upper area 381 for indicating that the window is for use in setting personal name information, such as "Hong Gil Dong", an area 382 for setting whether recorded data, such as "message data," and information, such as a phone number or search information on corresponding personal name information, such as "Hong Gil Dong," are to be displayed, a confirm button 383, and a cancel button 384. A user can preset the types of recorded data and whether recorded data related to a counterpart are to be displayed by entering respective personal name information through the setting window 380. Accordingly, if a call is received from a counterpart corresponding to personal name information, such as "Hong Gil Dong", the counterpart information processing section 220 searches for recorded data related to the counterpart from among recorded data of a selected type, such as message data, and displays the searched recorded data in the call screen window.

As illustrated in FIG. 14, the setting window 390 for setting the types of recorded data to be displayed by respective groups of personal name information includes an upper area 391 for indicating the window is for use in setting a group, an area 392 for setting recorded data to be displayed, a confirm button 393, and a cancel button 394. A user can preset the types of recorded data and whether recorded data related to a counterpart are to be displayed by entering respective groups of personal name information through the setting window 390.

Accordingly, if a call is received from a certain originating call's phone number corresponding to a predetermined group, such as workplace group, the counterpart information processing section 220 searches for recorded data related to the counterpart from among recorded data of a selected type, such as schedule data or photograph data, and displays the searched recorded data in the call screen window.

Although the counterpart information processing section 220 in the further embodiment of the present invention is disclosed as displaying recorded data related to a counterpart in the order of search and extraction results, the present invention is not so limited and a user may preset the displaying order of recorded data so that the user's setting can be reflected in the displaying order of recorded data related to the counterpart. For example, the control unit 200 may be implemented to allow a user to set priorities of each type of recorded data so that recorded data related to a counterpart can be searched for and displayed based on the predetermined priorities.

Although the control unit 200 in the embodiment of the present invention is disclosed as having a separate recorded data processing section 222 in order to display recorded data related to a counterpart, the present invention is not so limited. The control unit may be implemented to support multi-tasking so that a conventional recorded data viewer program, such as a text message confirmation program, a personal name information confirmation program, a schedule confirmation program, a memo confirmation program, or a photograph confirmation program, can be simultaneously executed together with a program for terminating a call.

Although the counterpart information processing section 220 in the embodiment of the present invention is disclosed as outputting recorded data related to a counterpart to the call screen window, the present invention is not so limited and may be implemented to output recorded data related to a counterpart in the form of an audio signal. For example, if recorded data related to a counterpart are absent subscriber transcription data, the counterpart information processing section 220 may be implemented to output the absent subscriber transcription data as a bell sound.

According to the present invention, a user can immediately view recorded data related to a communication counterpart, such as message data, absent subscriber call log data, absent subscriber transcription data, schedule data, memo data, or photograph data, when terminating or originating services for telephone communication are performed in the mobile phone. Since a user can refer to recorded data related to a counterpart before performing telephone communication, it is easier for the user to perform telephone communication with an unexpected person.

Specifically, since a user performs telephone communication while viewing message or schedule data related to a counterpart, it is easy for the user to manage customers and personal connections. Additionally, since the user can selectively search for recorded data related to a counterpart even while performing telephone communication, the user can more easily communicate with the counterpart and immediately search for data needed for the communication.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variation will be apparent to those skilled in the art. In the claims, means-plus-function clauses are intended to cover the structure described herein as performing the recited function and not only structural equivalents but also equivalent structures.

What is claimed is:

1. A mobile phone, comprising:
a memory unit adapted to store at least one phone number, search information corresponding to the at least one phone number and a plurality of recorded data; and
a control unit adapted to extract search information corresponding to a phone number of a communication counterpart, search for recorded data from among the plurality of recorded data that satisfies a search condition included in the search information and output the searched recorded data when a call terminating or a call originating service operation for telephone communication is requested,
wherein the search is performed using the extracted search information, and
wherein the searched recorded data include unconfirmed message data, absent subscriber transcription data, schedule data, and memo data,
wherein the searched recorded data are output prior to performing the call terminating or call originating service operation, and
wherein the control unit is further adapted to set whether recorded data are to be searched and displayed according to the types of recorded data and to search recorded data related to the communication counterpart from among the plurality of recorded data of a selected type.

2. The mobile phone of claim 1, wherein the search information comprises at least one of a specific keyword and information for designating a type of data to be searched.

3. The mobile phone of claim 1, wherein the control unit comprises:
a call processing section adapted to perform the call terminating or originating service operation with a specific phone number;
a search information extracting section adapted to extract the search information using the specific phone number; and
a recorded data processing section adapted to search the memory unit for the recorded data that satisfies the search condition and output the searched recorded data.

4. The mobile phone of claim 3, wherein the recorded data processing section is further adapted to display the searched recorded data on a screen.

5. The mobile phone of claim 4, wherein the recorded data processing section is further adapted to display the unconfirmed message data on the screen.

6. The mobile phone of claim 3, wherein the recorded data processing section is further adapted to output the absent subscriber transcription data as an audio signal.

7. A method of processing a phone call in a mobile phone, the method comprising:

setting whether recorded data are to be searched and displayed according to the types of recorded data;

receiving, by the mobile phone, a request for a call terminating or a call originating service operation for telephone communication;

extracting, by the mobile phone, search information corresponding to a phone number of a communication counterpart;

searching, by the mobile phone, recorded data related to the communication counterpart from among recorded data of a selected type for recorded data that comprises the extracted search information; and outputting, by the mobile phone, the searched recorded data prior to performing the call terminating or call originating service operation, wherein the searched recorded data include unconfirmed message data, absent subscriber transcription data, schedule data and memo data.

8. The method of claim 7, wherein receiving the request for the call terminating or call originating service operation comprises:

receiving a specific setup message for telephone communication from the communication counterpart; and extracting the phone number of the communication counterpart included in the setup message.

9. The method of claim 7, wherein extracting the search information comprises using the phone number of the communication counterpart to extract the search information if a specific phone number is called for performing the call originating service operation.

10. The method of claim 7, wherein the search information comprises at least one of a specific keyword and information related to designating a type of data to be searched.

11. The method of claim 7, wherein outputting the searched recorded data is performed prior to performing the telephone communication via the call terminating or call originating service operation.

12. The method of claim 7, wherein outputting the searched recorded data is performed when a predetermined control signal is received.

13. The method of claim 7, wherein the searched recorded data is output on a screen.

14. The method of claim 13, further comprising displaying the unconfirmed message data on the screen.

15. The method of claim 13, further comprising one of hiding the displayed searched recorded data and displaying other recorded data if a predetermined control signal is received while the searched recorded data are displayed on the screen.

16. The method of claim 13, wherein outputting the searched recorded data comprises:

displaying a plurality of items for which recorded data may be displayed; and displaying recorded data related to a specific one of the plurality of items upon selection of the specific item.

17. The method of claim 7, further comprising outputting the absent subscriber transcription data as an audio signal.

* * * * *